United States Patent [19]
Hansen

[11] Patent Number: 5,494,132
[45] Date of Patent: Feb. 27, 1996

[54] SIDE-LOADING SUSPENSION FRAME AND LADDER ASSEMBLY FOR MAINTENANCE OF ENERGIZED POWER TRANSMISSION LINES

[76] Inventor: Harry L. Hansen, 900 E. Indiantown Rd., Ste. 300, Jupiter, Fla. 33477

[21] Appl. No.: 195,528

[22] Filed: Feb. 14, 1994

[51] Int. Cl.$^6$ .................................................. E04G 3/10
[52] U.S. Cl. ........................... 182/150; 182/142; 104/112
[58] Field of Search ..................................... 182/150, 147, 182/10, 11; 244/118.1, 118.2, 137.1, 137.4; 104/112, 115, 116, 94, 95, 89, 192

[56] References Cited

U.S. PATENT DOCUMENTS

| | | | |
|---|---|---|---|
| 301,923 | 7/1884 | Reisdorff | 182/11 |
| 1,036,481 | 8/1917 | Fredeen | 182/150 |
| 3,033,978 | 5/1962 | Van Dusen | 104/115 X |
| 4,163,480 | 8/1979 | Highland | 182/150 X |
| 4,478,312 | 10/1984 | Kurteis | 182/150 X |
| 5,297,654 | 3/1994 | DeForges | 182/150 |

FOREIGN PATENT DOCUMENTS

| | | | |
|---|---|---|---|
| 238377 | 12/1910 | Germany | 104/115 |

*Primary Examiner*—Alvin C. Chin-Shue
*Attorney, Agent, or Firm*—Malloy & Malloy

[57] ABSTRACT

A frame and ladder assembly which includes an electrically conductive frame that is provided to engage two, generally parallel, aerially suspended, transmission conductors of a phase bundle and to be supported therefrom; within the frame a side opening structure which defines a cradle is provided, and in the cradle structure is provided means to engage the phase, such as a plurality of rollers with circumferential recesses, so that the frame can be repositioned along the phase similar to a carriage, without disengaging the frame from the phase; the ladder assembly comprises an insulated triangular ladder assembly which is attached at its vertex to the frame and hangs beneath it, permitting a line worker situated on the ladder assembly to easily perform maintenance and repairs on an energized phase directly above the ladder assembly; the ladder assembly is also comprised of pivotally connected ladder legs so that when the top of one of the two inclined side ladders is released from the frame, the other ladder legs of the assembly will pivot relative to one another and hang vertically, downwardly from the frame, affording the line worker a means of safely descending from the energized bundled conductor phase; a support cable with an insulating segment is releasably attached at one of its ends to a harness connected to the frame and at its other end to a lifting means, such as a helicopter, which can aerially transport the ladder and frame assembly to, and position it in supportable engagement with two of the transmission conductors in the side opening cradle of the frame.

13 Claims, 2 Drawing Sheets

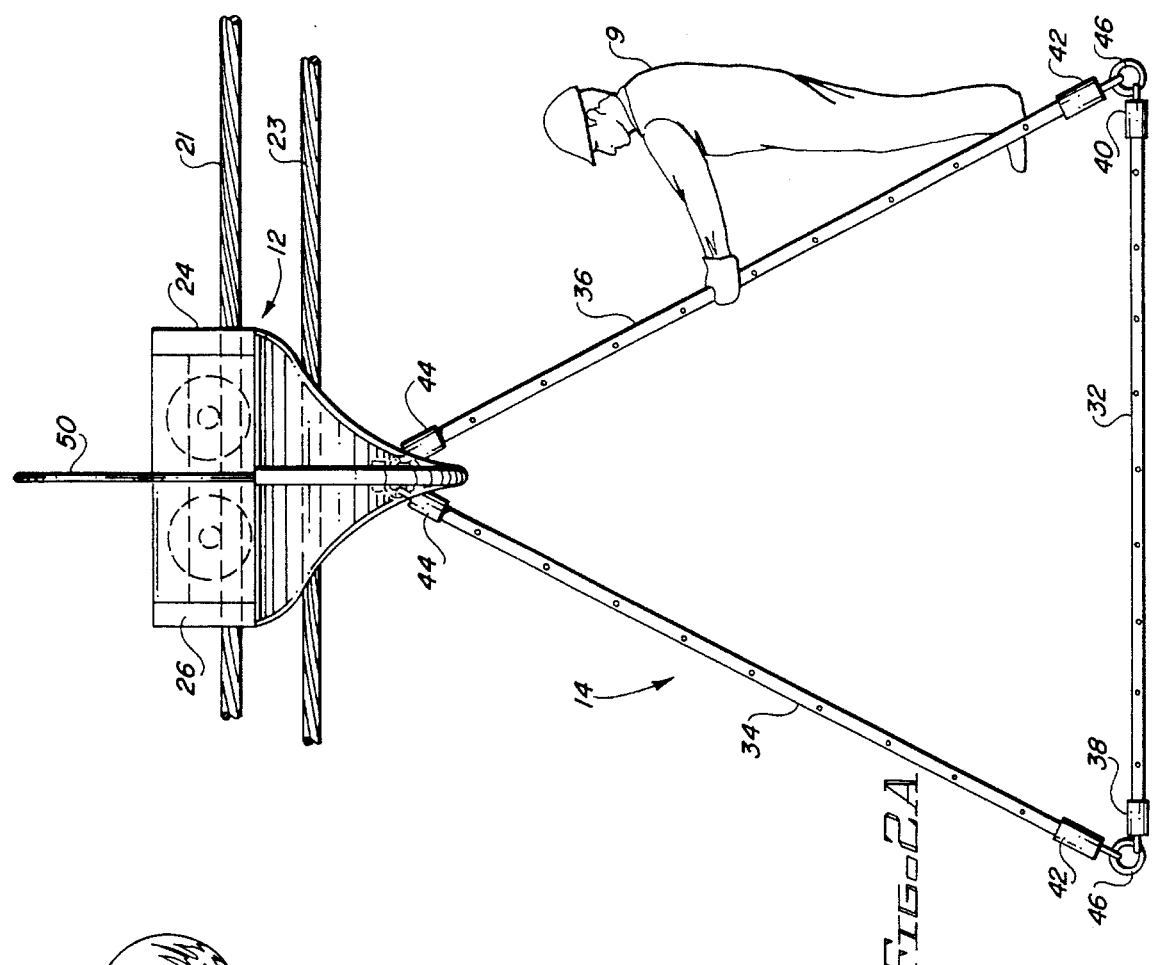
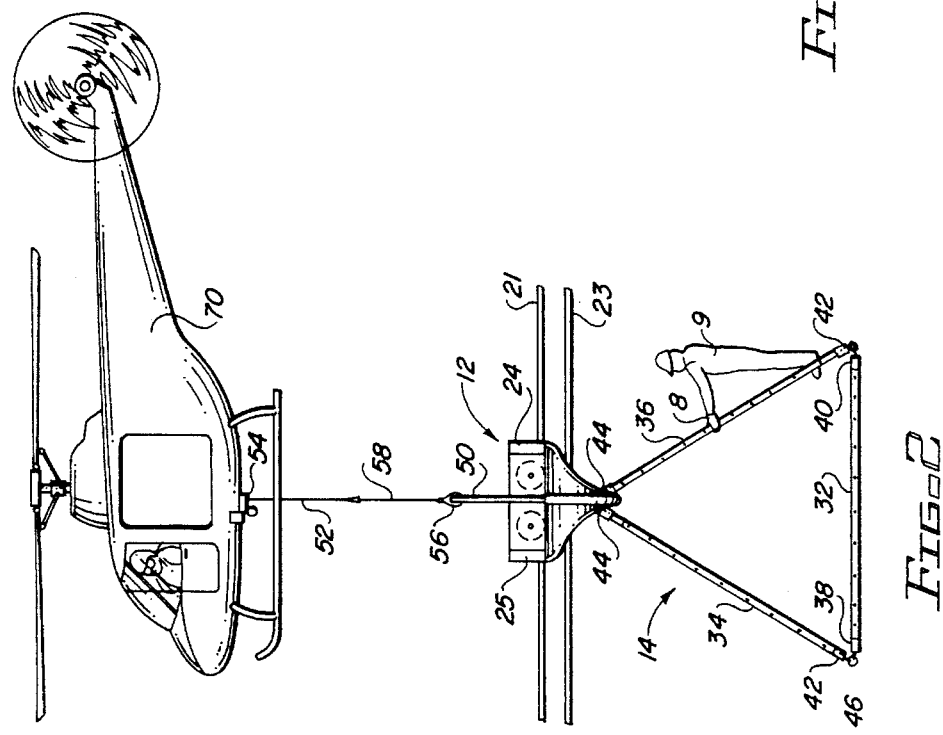

SIDE-LOADING SUSPENSION FRAME AND LADDER ASSEMBLY FOR MAINTENANCE OF ENERGIZED POWER TRANSMISSION LINES

BACKGROUND OF THE INVENTION

1. Field of the Invention

This invention relates to a novel apparatus for placing line workers in close proximity to bundled conductors of energized high voltage power transmission lines to enable the line workers to effect repairs or maintenance thereof, while providing a means for the line worker to safely descend from the apparatus to the ground in an emergency.

2. Description of the Related Art

Electrical power is transmitted from generating facilities to consumers over long distances by means of high voltage conductors which can carry voltages ranging from 5 kilovolts to 800 kilovolts, and higher. These high voltages are ultimately stepped down by means of transformers so the electrical power can be used by consumers.

Standard high voltage alternating current transmission lines employ three conductors, each conductor carrying voltage 120° out of phase to each other and referred to as a "phase".

When more than one individual conductor is used per phase, the group of conductors comprising a phase is known as "bundled conductors".

Such extra high voltage (ehv) transmission lines are serviced, repaired and maintained either in an energized or de-energized state. In order to avoid the loss of revenues resulting from shutting down or de-energizing a line to perform maintenance on it, the electrical utility industry prefers the energized state. Currently, one generally accepted method of repair, maintenance and inspection of energized transmission lines is known as "barehand work".

Barehand work is the technique of performing live maintenance on energized conductor and equipment whereby one or more line workers work directly on an energized part after having been raised and bonded to the energized conductor or equipment.

At locations away from the tower or structure, these line workers are normally placed in a position adjacent to the energized bundled conductor by an insulated boom and bucket attached to a grounded truck, by a fixed platform-physically and electrically attached to an electrically isolated hovering helicopter, or by an electrically insulated sling line suspended from a grounded crane or electrically isolated hovering helicopter.

At locations near or at the tower or structure, the line workers access the energized bundled conductors from the tower or structure by climbing down insulated ladders.

At locations away from the tower or structure, the truck boom and bucket, the fixed platform attached to the helicopter, and the sling line from the crane are required to remain in position for an extensive time which lengthens the exposure time in the electrically charged space between the energized conductors and grounded structure/tower components and increases the risk of a flashover or physical damage due to mechanical failure of the bucket truck, crane or helicopter. This risk is magnified greatly at positions of the center conductor phase on a horizontally configured three phase or bundled arrangement, usually a pair of generally parallel lines above a central lower line.

The related art discloses several systems and apparatuses for intended for use in connection with the servicing of energized transmission lines by "barehand work". U.S. Pat. No. 3,139,948 discloses a personnel carrier that is elevated by an aerial lift to support the line worker located in the carrier adjacent to an energized transmission line. The carrier has a conductive surface that is connected to the energized line and with which the line worker is in electrical contact, so that the line worker can be maintained at the same potential as the energized conductor. The carrier is insulated from the vehicle on which the aerial lift is situated and from ground. The major drawback to this system is that the vehicle and aerial lift must remain in position while the carrier is elevated to the line.

U.S. Pat. No. 4,478,312 discloses a portable inverted U-shaped cage for servicing an energized transmission line which is lowerable by helicopter from a position directly above the line thereonto. The cage consists of a horizontal frame and two baskets in which the line workers are situated, each basket connected to and hanging downwardly from the ends of the crossframe. The lower side of the crossframe includes skids or rollers to engage the line, on which the cage is aerially self-supported. Both the crossframe and cage are electrically conductive, as are the skids or rollers, as the case may be, so that the entire cage and line workers therein are electrically interconnected to the energized power line, whereby the cage and line workers become energized to the same voltage potential as that of the line. It should be noted that so long as the cage remains on the line, however, the line worker's body potential will be maintained at the potential of the line. In the event of a helicopter's mechanical failure, safety means should be provided whereby the line worker can descend to the ground, however, in this patented invention, the line worker must remain in the portable cage energized to the line potential until a replacement helicopter arrives to remove the cage from the line.

U.S. Pat. No. 4,673,059 to Kurtgis discloses a system for placing a line worker onto an energized transmission line. The line worker is positioned in a bosun's seat with a body harness that includes snap hooks or pulleys. The body harness is releasably connected to one end of a suspension means which includes an insulated link, and the other end of the suspension means is connected to a support means such as an electrically isolated helicopter or grounded crane. The helicopter or crane transports the line worker adjacent the energized line, to which the lineman connects the snap hooks or pulleys, which are electrically conductive. An emergency descent means consisting of an insulated rope and attachment device is provided so that the line worker can lower himself to the ground. The primary disadvantage of this system is that it allows only one worker at a time to be positioned directly in front of a particular section of transmission line to perform repairs or maintenance thereon and the insulated rope can become wet and hence, "conductive" which provides an electrical path to ground.

There remains a need in the art for a portable system that can be easily transported by an aerial lifting means to a bundled conductor phase, on which the system is fully self-supported, which can be moved laterally along the transmission lines without being disengaged therefrom, which permits more than one line worker at a time to perform maintenance or repairs on a particular section of energized transmission line which reduces the risk of flashover or mechanical failure due to extensive time of support equipment in a compromised position, and which provides a safety means for descending from the line. The present invention is adapted to meet these needs.

SUMMARY OF THE INVENTION

It is an object of the present invention to provide a system that can be easily transported to a bundled conductor phase of a transmission line for "side-loading thereon", and which can subsequently support itself on the phase.

Another object of the present invention is to provide an apparatus or system that can be moved laterally along the two horizontal, generally parallel conductors of a transmission phase bundle to which it is engaged without having to be disengaged therefrom.

It is an additional object of the present invention to provide a system that permits more than one line worker at a time to conveniently perform maintenance or repairs on a particular section of a transmission phase.

A further object of the present invention is to provide a system that permits one or more line workers to perform maintenance or repairs on an energized power phase utilizing "barehand" work procedures, whereby the worker's body is at the same voltage potential as the energized transmission phase.

It is yet another object of the present invention to provide a safety means whereby a line worker can descend from the phase to the ground in an emergency, should be required if other means of descending are unavailable.

In accordance with one general aspect of the present invention, there is provided a "side-loading" frame to be described and a ladder assembly. The invention includes an electrically conductive frame with a side-opening cradle that is structured and disposed to engage a pair of the bundled conductors of aerially suspended, generally parallel, energized transmission phases and thereafter, to be supported therefrom. The cradle preferably includes means for movably engaging the transmission lines so that the frame may be moved along the pair of lines without having to disengage the frame therefrom. In a preferred embodiment, an insulated triangular ladder assembly is attached at its apex or vertex to the frame and hangs in depending relation beneath it. This permits one or more line workers situated on the ladder assembly to easily perform maintenance and repairs on the energized bundled conductors directly above the ladder assembly. Preferably, the ladder assembly is structured and disposed such that when the top of one of the side ladders is released from the frame, the ladder assembly hangs vertically, downwardly from the frame, affording the line worker a means to safely descend from the line.

In use, a harness and suspension means including an insulating segment is releasably attached at one of its ends to the frame and at its other end to a lifting means such as a helicopter, which is used to aerially transport the invention to, and position the side-loading frame in engagement with, the transmission bundled conductors.

BRIEF DESCRIPTION OF THE DRAWINGS

The invention will be better understood after reading the following detailed description of the presently preferred embodiment thereof with reference to the appended drawings in which:

FIG. 2 illustrates a side view of a preferred embodiment of the frame and ladder assembly supported on a transmission line bundle.

FIG. 2A illustrates an enlarged side view of the lower portion of the preferred embodiment of the frame and ladder assembly seen in FIG. 2 and supported on transmission lines.

DETAILED DESCRIPTION OF THE PREFERRED EMBODIMENT

Figure 1:
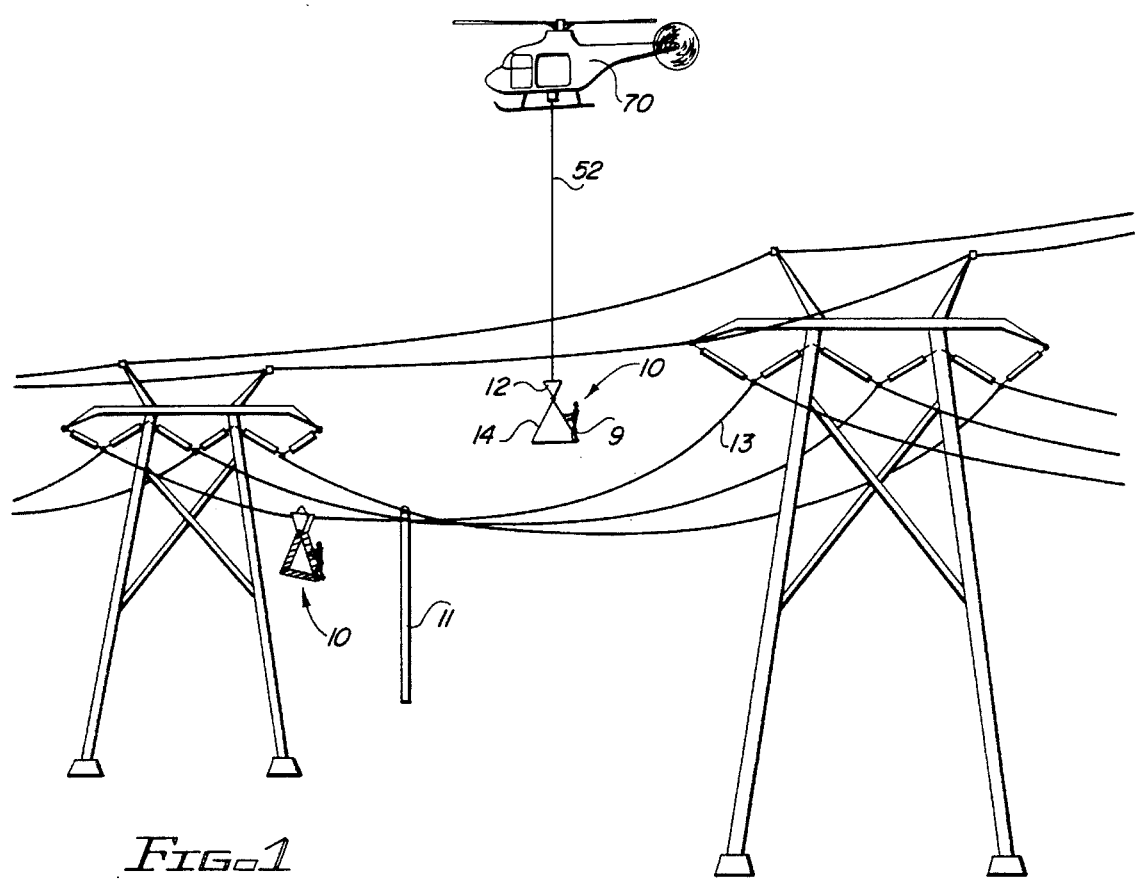
FIG. 1 illustrates generally, a perspective view of the preferred embodiment of the frame and ladder assembly being positioned onto the transmission lines by a helicopter, wherein two such assemblies are already in place.
Figure 3:
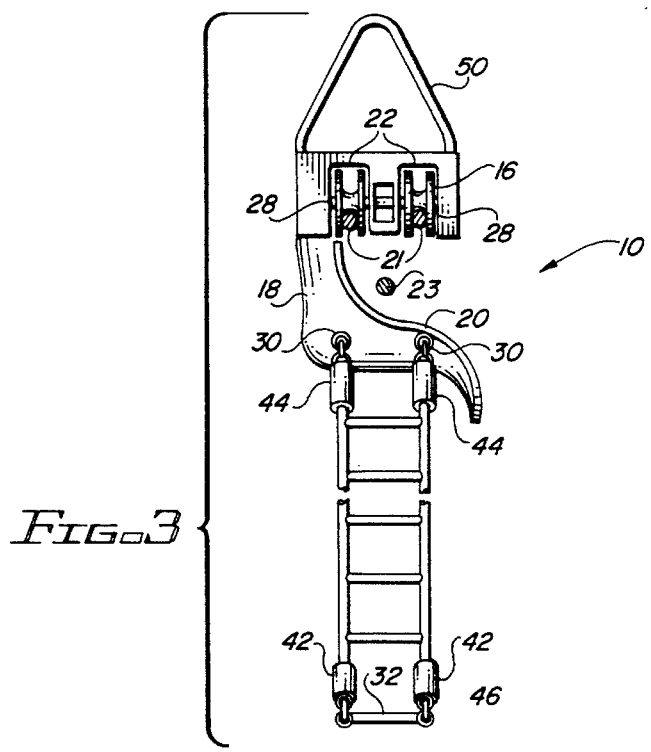
FIG. 3 illustrates an end view of the preferred embodiment of the frame and ladder assembly from the side of the view seen in FIGS. 2 and 2A.

Referring to the drawings, there is shown in FIG. 1 a preferred embodiment of the invention 10 which includes a frame 12 of an electrically conductive material and a triangular ladder assembly 14 of an electrically insulating material. As shown in FIG. 3, the frame has a generally horizontal upper portion 16 and a lower portion 18 integral therewith. The lower portion 18 is structured and disposed to form a side opening cradle 20 within the frame 12. The upper portion 16 includes a pair of parallel recesses 22 that extend laterally therethrough from a first side 24 to a second side 26 of the upper portion 16, the recesses being spaced apart a distance substantially equivalent to the distance between a pair of aerially suspended, generally parallel, transmission conductors 21 occupying the same horizontal plane. It will be appreciated that the power transmission lines to be maintained are generally horizontally configured in a three phase bundled arrangement, having a pair of generally parallel lines 21 above a central lower line 23. The invention is provided with means for movably engaging the two generally parallel lines so that the frame and ladder assembly supported therefrom can be moved along said lines. For example, a pair of rollers 28 adapted to movably engage the generally parallel transmissions of the conductor bundle are rotatably disposed, one of the pair within each recess 22, one roller 28 being positioned in the recess 22 adjacent the first side 24 and another roller 28 being positioned in the recess 22 adjacent the second side 26. The frame preferably also includes a braking means for maintaining the invention 10 at a selected location on the lines. The braking means will be more fully referred to herein after.

The lower portion 18 includes means 30 for attaching the ladder assembly 14 to the frame 12. The ladder assembly 14 is of an electrically insulating material that insulates the ladder assembly 14 from the frame and from ground. The insulation of the ladder assembly 14 reduces primary danger associated with "barehand" maintenance of an energized transmission line occurring when the line worker is transferred to the energized component and his body potential is changed from an isolated to a conductive state. In short, it provides an insulated vehicle from which the worker may safely make contact with the energized transmission line.

The preferred ladder assembly 14 is shown in FIGS. 2 and 2A. It includes a triangular arrangement of ladders: a) a base ladder 32, b) a first inclined side ladder 34, and c) a second, generally opposing, inclined side ladder 36. The base ladder 32 has a first end 38 and a second end 40. Each of the first inclined side ladders 34 and 36 has a lower end 42 and an upper end 44. There are included a pair of insulated rings 46 for interconnecting the ladder assembly 14. The lower end 42 of the first inclined side ladder 34 and the base ladder first end 38 are both pivotally connected to at least one insulated ring 46, and the lower end 42 of the second inclined side ladder 36 and the base ladder second end 40 are both pivotally connected to at least one other insulated ring 46. The upper ends 44 of the first 34 and second 36 inclined side ladders are releasably connected to the attaching means 30 so as to form a vertex of the ladder assembly 14. The ladder assembly 14 may also include an insulated compartment (not shown) in which materials, tools and other equipment may be kept.

In the event of an emergency, for example if the helicopter or other lifting means were to suffer mechanical failure, safety means should be provided in the preferred embodiment, to allow the line worker to descend to the ground. In the embodiment described, the ladder assembly is preferably of a triangular arrangement, such that when the top of one of the side ladders 34 or 36 is released from the frame, the ladder assembly hangs vertically, downwardly from the frame, affording the line worker a means to safely descend from the line, as shown in FIG. 1 generally by the numeral 11.

There is shown in FIG. 2 a harness means 50 that is adapted to be attached to the frame 12 and to a suspension means 52. The suspension means 52 has a first end 54 that is adapted to be releasably connected to lifting means, such as a helicopter 70, and a second end 56 that is adapted to be releasably connected to the harness means 50. The suspension means 52 includes an insulated segment 58 that is disposed between the first end 54 and the second end 56 of the suspension means 52. The insulated segment 58 must have sufficient dielectric strength to provide an insulated gap in the conductive path running from the frame 12 to the lifting means 70. It can be made of any suitable material or object, such as a transmission line insulator or a fiberglass stick.

In the use of the invention, as illustrated in FIG. 1, a helicopter 70 or other lifting means is used to aerially transport the invention 10, with at least one worker situated on the ladder assembly 14, which hangs beneath the frame 12. For example, two workers can be situated on the ladder assembly, one on each of the inclined side ladders 34 and 36. The frame 12 is moved adjacent to two spaced, generally parallel conductors of the bundle, 21 that are generally in the same horizontal plane of a transmission line phase. The helicopter then flies slowly in the appropriate direction to effect a lateral movement of the frame 12 until the two parallel conductors of the bundle 21, are positioned within the side opening cradle 20 of the frame 12 directly below the corresponding parallel recesses 22 in the upper portion 16 of the frame 12. The helicopter then lowers the frame 12, preferably at or near an area where the bundled conductor starts a downward slope such as shown by 13 in FIG. 1, and the lowering of the frame will result in the pair of rollers 28 disposed within each recess 22 to engage one of the corresponding two parallel conductors of the bundle. After the frame 12 has thus supportably engaged the two parallel conductors of the bundle, a line worker on the ladder assembly 14 may apply a braking means to maintain the invention 10 a selected location along it. The suspension means 52 is then disconnected from the harness means 50, thereby enabling the helicopter to leave the site, with the invention 10 being self-supported on the transmission lines.

The line worker 9, on the ladder assembly 14, who is outfitted in electrically conductive clothing, connects a conductive lead 8, from the conductive clothing to the energized line. This raises the worker's body potential to the same potential as the line and the frame. The line worker may then perform repairs, inspection, and maintenance conveniently on a section of the line directly above the ladder assembly 14. If the line worker needs to perform work at a different location along the same line, the invention 10 can be moved laterally to a new location without disengaging the frame 12 from the bundled conductors on which it is supported. For example, the line worker may simply release the braking means, and allow the frame and ladder assembly to roll, under the force of gravity, along the two generally parallel conductors from a location such as at 13 in FIG. 1 in the direction of the arrow to another selected location along the conductors, where the braking means can be re-applied. Alternatively, the line worker may reattach the suspension means 52 hanging from the helicopter to the harness means 50 and disconnect the conductive clothing lead from the line. He may then release the brake means, so that lateral movement of the helicopter in the appropriate direction causes a lateral movement of the frame 12 in relation to the first working location along the bundled conductors on which it is supported. After the line worker has been moved along the line to a new work location, the brake means may be again applied, the conductive clothing lead is again connected to the line, and the suspension means 52 is again released from the harness means 50, enabling the helicopter to leave the site once again. Thus, the helicopter may service several of the assemblies described herein, thereby allowing maintenance work on the transmission lines to proceed rapidly.

To remove the invention 10 from the bundled conductors on which it is supported, the suspension means 52 hanging from the helicopter is reattached to the harness means 50. Next, the line worker releases the brake means and disconnects the conductive clothing lead from the line, and the helicopter then slowly ascends such that the line-engaging, rollers 28 journaled in the side opening cradle 20 or frame cavity, (which can be considered to be line engaging means generally), and the frame 12 will become disengaged from the bundled conductors on which it was supported. The helicopter then flies in the appropriate direction to effect a lateral movement of the frame 12 such that the bundled conductors are removed from within the side opening cradle 20 of the frame 12, at which point the helicopter is able to transport the invention 10 and line workers thereon to a new work location.

Any suitable braking means may be provided to form a snug fit of the two generally parallel lines of the bundle in the recess, as shown, and the recesses may be in the form of circumferential recesses or two pairs of spaced, pulley-type, roller means journaled to the frame, the rotation of which may be controlled to restrain rolling movement along the two upper, generally parallel conductors of the bundle. Means to permit or prohibit rolling movement of a carriage are well known in other fields and the type shown to be used in this invention in this unrelated field should not be considered as limiting this overall invention.

Since many modifications, variations and changes in detail can be made to the described preferred embodiment of the invention, and its method of use, it is intended that all matters in the foregoing description and shown in the accompanying drawings be interpreted as illustrative and within the scope and spirit of this invention, and not in a limiting sense. Thus, the scope of the invention should be determined by the appended claims and their legal equivalents.

What is claimed is:

1. A side-loading frame adapted to be positioned by a lifting means onto bundled conductors of aerially suspended phases for supported engagement thereby, said frame comprising:

(a) a frame including an upper portion, a lower portion and a side opening cavity within said frame, said upper and lower portions being structured and disposed to receive conductors in said frame cavity;

(b) means in said cavity to engage the conductors;

(c) a ladder assembly comprising three ladders connected in a triangular arrangement, one of said ladders being generally horizontally disposed so as to form a base of the triangular arrangement, said base ladder having a first end and a second end, said ladder assembly further including a first and a second inclined ladder forming two sides of the triangular arrangement, said inclined ladders each having a lower end and an upper end, said lower end of said first inclined ladder being pivotally connected to said first end of said base ladder and said lower end of said second inclined ladder being pivotally connected to said second end of said base ladder, said upper ends of said first and second inclined ladders being positioned adjacent one another to form a vertex of said ladder assembly; and (d) means for connecting said ladder assembly to said frame in depending relation, and including means for releasing at least one of said inclined ladders from said frame.

2. A frame and ladder assembly as recited in claim 1 wherein said means to connect is structured and disposed to releasably hold each of said upper ends of said first and said second inclined ladders, said lower end of said first inclined ladder being pivotally connected to said first end of said base ladder and said lower end of said second inclined ladder being pivotally connected to said second end of said base ladder, whereby release of said upper end of only one of said inclined ladders causes said inclined ladder to drop downwardly such that said ladders of said assembly hang generally down from said frame.

3. A side loading frame and ladder assembly as recited in claim 1 further comprising:

(a) harness means attached to said frame;

(b) suspension means for lifting said frame and said ladder assembly, said suspension means having a first end and a second end, said second end including means to connect to said harness means, and said first end including means to connect to a lifting means;

whereby a lifting means is effective to aerially position said frame and ladder assembly by said suspension means and said harness means to a supported position on two generally parallel conductors of a bundle disposed within said frame and ladder assembly supportably depending from the conductors of the bundle.

4. A side loading frame as recited in claim 1, further comprising braking means for said frame and means structured and disposed within said frame for movably engaging the phase, whereby said frame can alternately be maintained at a selected location, or moved along the phase without the frame being disengaged from the conductors.

5. A side-loading frame as recited in claim 1, wherein said upper portion includes a pair of parallel recesses extending laterally therethrough, said recesses being spaced apart a distance substantially equivalent to the distance between said at least two conductors.

6. A side-loading frame as recited in claim 5, wherein said means for movably engaging said conductors comprises at least one roller rotatably disposed within each of said recesses in said upper portion of said frame.

7. A side-loading frame as recited in claim 1, further comprising means for braking said frame at a selected location on said conductors.

8. A side-loading frame as recited in claim 1, wherein said means for attaching comprise at least one ring.

9. A side-loading frame as recited in claim 1, wherein said ladder assembly includes an electrically insulated material.

10. A side-loading frame as recited in claim 1, further comprising harness means.

11. A side-loading frame as recited in claim 10, further comprising suspension means for lifting said frame and said ladder assembly, said suspension means having a first end and a second end, said second end including means to connect to said harness means, and said first end including means to connect to a lifting means, whereby the lifting means is effective to aerially position said frame and ladder assembly by said suspension means and said harness means to a supported position on at least two generally parallel conductors of the bundle disposed within said frame and ladder assembly supportably depending from the conductors of the bundle.

12. A side-loading frame adapted to be positioned by a lifting means onto bundled conductors of aerially suspended phases for supported engagement thereby, said frame comprising:

(a) a frame including an upper portion, a lower portion and a side opening cavity within said frame, said upper and lower portions being structured and disposed to receive at least one conductor in said frame cavity;

(b) means in said cavity for engaging said at least one conductor;

(c) said lower portion of said frame being structured and configured to guide at least one of said conductors upwardly and into said side opening cavity upon a lateral movement of said frame;

(d) said frame being sized, dimensioned and configured for being independently supported on said at least one conductor; and (e) a ladder assembly comprising three ladders connected in a triangular arrangement, one of said ladders being generally horizontally disposed so as to form a base of the triangular arrangement, said base ladder having a first end and a second end, said ladder assembly further including a first and a second inclined ladder forming two sides of the triangular arrangement, said inclined ladders each having a lower end and an upper end, said lower end of said first inclined ladder being pivotally connected to said first end of said base ladder and said lower end of said second inclined ladder being pivotally connected to said second end of said base ladder, said upper ends of said first and second inclined ladders being positioned adjacent one another to form a vertex of said ladder assembly; and (f) means for connecting said ladder assembly to said frame in depending relation, and including means for releasing at least one of said inclined ladders from said frame.

13. A frame and ladder assembly as recited in claim 12 wherein said means to connect is structured and disposed to releasably hold each of said upper ends of said first and said second inclined ladders, said lower end of said first inclined ladder being pivotally connected to said first end of said base ladder and said lower end of said second inclined ladder being pivotally connected to said second end of said base ladder, whereby release of said upper end of only one of said inclined ladders causes said inclined ladder to drop downwardly such that said ladders of said assembly hang generally down from said frame.

* * * * *